United States Patent
Page et al.

(10) Patent No.: US 9,720,102 B1
(45) Date of Patent: Aug. 1, 2017

(54) FILTER ARRAYS

(71) Applicant: Sandia Corporation, Albuquerque, NM (US)

(72) Inventors: Ralph H. Page, Castro Valley, CA (US); F. Patrick Doty, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 39 days.

(21) Appl. No.: 14/678,670

(22) Filed: Apr. 3, 2015

(51) Int. Cl.
    *G01T 1/20*     (2006.01)
    *G02B 5/20*     (2006.01)
    *G02B 5/28*     (2006.01)

(52) U.S. Cl.
    CPC ............ *G01T 1/2002* (2013.01); *G02B 5/201* (2013.01); *G02B 5/28* (2013.01)

(58) Field of Classification Search
    CPC ................................ G01T 1/2018; G01T 1/20
    See application file for complete search history.

(56) References Cited

U.S. PATENT DOCUMENTS 3,798,448 A * 3/1974 Menefee ................. G01T 1/202
    250/361 R
9,113,096 B1 * 8/2015 Azuma ................... H04N 5/335

2006/0011854 A1 * 1/2006 Katagiri .................... G01T 3/06
    250/390.11
2008/0130265 A1 * 6/2008 Negley .................... H01L 33/44
    362/84
2008/0210877 A1 * 9/2008 Altman .................. A61B 6/032
    250/366
2011/0108738 A1 * 5/2011 Doty ...................... C09K 11/06
    250/459.1

OTHER PUBLICATIONS

Feng, et al., "Spectral- and Pulse-Shape Discrimination in Triplet-Harvesting Plastic Scintillators", IEEE Transactions on Nuclear Science, vol. 59, No. 6, Dec. 2012, pp. 3312-3319.

* cited by examiner

*Primary Examiner* — Kiho Kim
(74) *Attorney, Agent, or Firm* — Medley, Behrens & Lewis, LLC

(57) ABSTRACT

The various technologies presented herein relate to a tiled filter array that can be used in connection with performance of spatial sampling of optical signals. The filter array comprises filter tiles, wherein a first plurality of filter tiles are formed from a first material, the first material being configured such that only photons having wavelengths in a first wavelength band pass therethrough. A second plurality of filter tiles is formed from a second material, the second material being configured such that only photons having wavelengths in a second wavelength band pass therethrough. The first plurality of filter tiles and the second plurality of filter tiles can be interspersed to form the filter array comprising an alternating arrangement of first filter tiles and second filter tiles.

17 Claims, 6 Drawing Sheets

US 9,720,102 B1

FILTER ARRAYS

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

In the field of nuclear-radiation detection, a pulse-shape discrimination (PSD) technique can be utilized with scintillators to distinguish reactions to different kinds of radiations. Owing to the phenomenon of ionization quenching, high-dE/dx particles (e.g., particles that have short ranges) create a different temporal signature compared to a signature of low-dE/dx particles (e.g., particles that have long ranges). Thus, PSD can be used to discriminate between neutrons that have interacted in a scintillator (e.g., which dislodge protons that are stopped in a short range) and gamma rays that have interacted in the scintillator (e.g., which produce fast electrons having a longer range than particles formed by the neutron/proton interaction.) To differentiate events using PSD, fast (and thus expensive) electronics are required to follow the associated fast (e.g., of a nanosecond-timescale) scintillator waveforms.

SUMMARY

The following is a brief summary of subject matter that is described in greater detail herein. This summary is not intended to be limiting as to the scope of the claims.

Various exemplary embodiments presented herein relate to fabrication and operation of an apparatus that is configured to perform spatial sampling through use of a tiled filter array. In an example, the apparatus can be used to detect neutrons (e.g., discriminate between neutrons and gamma rays).

The apparatus can comprise a filter array that includes a plurality of filters, whereby the plurality of filters comprises a first set of filters configured to allow passage therethrough of photons having wavelengths in a first wavelength band ($w_1$), while preventing passage therethrough of photons having wavelengths outside of $w_1$. The plurality of filters further comprises a second set of filters configured to allow passage therethrough of photons having wavelengths in a second wavelength band ($w_2$), while preventing passage therethrough of photons having wavelengths outside of $w_2$. In an example, $w_1$ and $w_2$ are non-overlapping.

The first set of filters and the second set of filters can be respectively formed from "tiles" or "pixels", whereby the first set of filter tiles and the second set of filter tiles can be interspersed to form the filter array that includes an alternating arrangement of first filter tiles and second filter tiles. Thus, the first set of filters and the second set of filters can be arranged in a checkerboard pattern.

The apparatus additionally includes a scintillator that is configured to (isotropically) emit photons when a particle (e.g., a neutron, gamma ray, etc.) interacts with scintillator material of the scintillator. In an example, an interaction between the scintillator material and a neutron results in emission of photons at a first ratio of (photons having wavelengths in $w_1$)/(photons having wavelengths in $w_2$), while interaction between the scintillator material and a gamma ray results in emission of photons at a second ratio of (photons having wavelengths in $w_1$)/(photons having wavelengths in $w_2$). Accordingly, an interaction can be identified as corresponding to either a neutron or a gamma ray by estimating the above-mentioned ratio.

To allow for estimation of the ratio, the filter array can be located on an external surface of the scintillator. The apparatus can further include at least two photo detectors: a first photodetector that is optically coupled to at least one filter (e.g., a first filter) in the first set of filters; and a second photodetector that is optically coupled to at least one filter (e.g., a second filter) in the second set of filters. As the first filter is configured to allow passage of photons having wavelengths in $w_1$ while filtering photons having wavelengths outside of $w_1$, the first photodetector can generate a first signal that is indicative of volume of photons having wavelengths in $w_1$. Similarly, the second photodetector can generate a second signal that is indicative of volume of photons having wavelengths in $w_2$. A computing device or circuit can be configured to compute the ratio between the first signal and the second signal, and can identify the type of the particle (e.g., neutron or gamma ray) based upon the computed ratio between the signals.

While the description above refers to use of the exemplary apparatus in connection with discriminating radioactive particles, it is understood that the tiled filter array described herein can be employed in other applications where optical signals are to be measured and/or a ratio between signals is to be computed.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
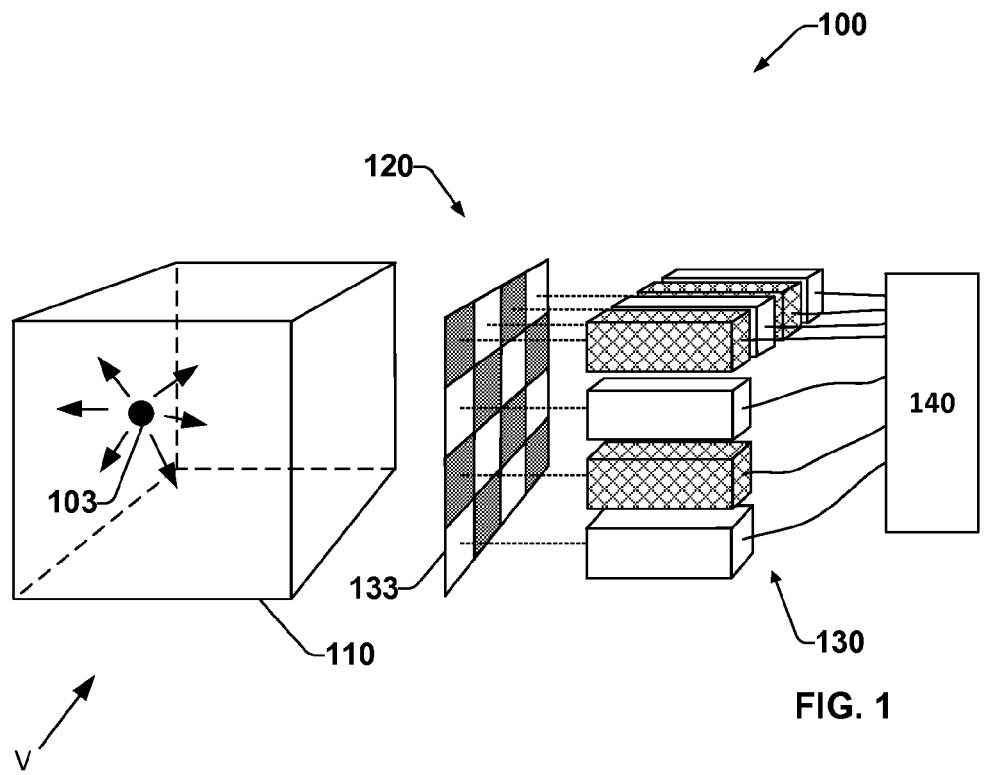
FIG. 1 illustrates an exemplary apparatus that is configured to discriminate between neutrons and gamma rays.

Various technologies pertaining to discriminating between neutrons and gamma rays are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

FIG. 1 illustrates an exemplary apparatus 100 that is configured to discriminate between neutrons and gamma rays (or other types of electromagnetic particles). In an embodiment, the scintillator apparatus 100 can be utilized to monitor and/or detect various subatomic particles, electromagnetic particles, nuclear particles, etc., which can be generated by, or result from, for example, one or more nuclear reactions. For example, the apparatus can use a technique referred to herein as spectral shape discrimination (SSD) to perform particle discrimination. SSD relies on the ionization-quenching phenomenon that occurs in scintillators. For instance, scintillators that can be used in SSD techniques emit light in two different wavelength bands (e.g., a first wavelength band $w_1$ and a second wavelength band $w_2$). The relative amounts of light in the two bands can depend upon an ionization density created by a particle(s) travelling in a scintillator material. Hence, SSD can facilitate distinguishing neutrons from gamma rays; however, SSD can be performed without the burden of fast electronics that are required for PSD.

The apparatus 100 can include a scintillator 110 that is composed of scintillating material. For example, a neutron 103 may be emitted responsive to the occurrence of a nuclear reaction, and can enter the scintillator 110. When the neutron 103 interacts with the scintillating material of the scintillator 110, the apparatus 100 is configured to determine that the interaction corresponds to a neutron (rather than, for example, a gamma ray).

In an embodiment, the neutron 103 enters the scintillator 110 and interacts with the scintillating material at a particular location in the scintillator 110, resulting in (e.g., isotropic) emission of photons from the particular location. The emitted photons may include a first set of photons that have wavelengths in $w_1$, and may further include a second set of photons that have wavelengths in $w_2$. In an example, $w_1$ and $w_2$ can be non-overlapping.

In an example, the ratio between: 1) a number of the emitted photons having wavelengths in $w_1$; and 2) a number of emitted photons having wavelengths in $w_2$ can be indicative of whether the interaction corresponds to a neutron versus whether the neutron corresponds to a gamma ray (or some other particle). Aspects described herein relate to configurations of the apparatus 100 that enable relatively accurate estimation of such ratio, and thus relatively accurate discrimination between neutrons, gamma rays, etc. that interact with the scintillating material.

In an aspect, wavelength $w_1$ can be about 440-500 nm (e.g., a blue light portion of the visible spectrum), while wavelength $w_2$ can be about 495-570 nm (e.g., a green light portion of the visible spectrum), however, any wavelengths are equally applicable to the various embodiments presented herein. As indicated, the wavelengths may partially overlap.

In an embodiment, the scintillator 110 can be a three-dimensional (3D) shape, such as a cuboid, a rectangular cuboid, a cylinder, etc. Accordingly, a scintillator 110 having a 3D shape can comprise one or more external surfaces upon which one or more filter arrays 120 can be located.

The apparatus 100 further includes a filter array 120 that can include a plurality of filters. In an example, the plurality of filters can have a planar profile, and accordingly, the plurality of filters can be arranged in a "tiled" or "checkerboard" formation, or layout, to form the filter array 120. In an aspect, the size of each filter (e.g., width and/or height) in the plurality of filters can be sufficiently small to mitigate detection-efficiency variations between each filter. The filters can be of a number, size and arrangement to enable high "aperture fill" of a filter (and detector attached thereto) to enhance detection of photons having the above-mentioned wavelengths. While the exemplary filter array 120 is illustrated as including 16 filters, it is to be understood that the filter array 120 can include more or fewer filters.

Figure 2:
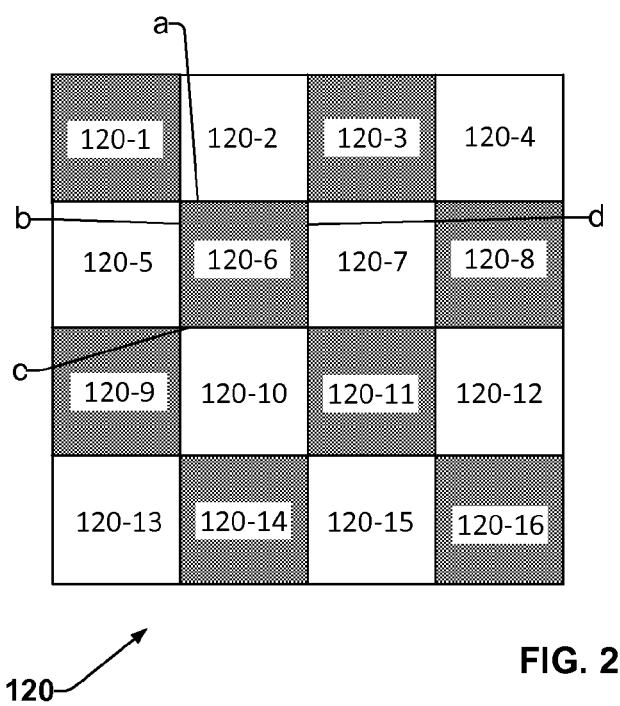
FIG. 2 is a schematic of a filter array comprising tiles of a first material type and a second material type.

With reference to FIG. 2, the filter array 120 is presented as comprising a 4×4 array of filters 120-1-120-16. In an embodiment, the filter array 120 includes a first set of filters (e.g., filters 120-1, 120-3, 120-6, 120-8, 120-9, etc., as marked by the dark regions on FIGS. 1 and 2), which are configured to allow photons having wavelengths in $w_1$ to pass through, while photons having wavelengths outside of $w_1$ are filtered (e.g., reflected or absorbed). Further, the filter array 120 includes a second set of filters (e.g., filters 120-2, 120-4, 120-5, 120-7, etc., as marked by the light regions on FIGS. 1 and 2), which are configured to allow photons having wavelengths in $w_2$ to pass through, while photons having wavelengths outside of $w_2$ are filtered (e.g., reflected or absorbed). In effect, by interspersing the respective $w_1$ and $w_2$ filters in the filter array 120, spatial effects can be mitigated as a luminescence event can occur proximate to a $w_1$ filter and/or a $w_2$ filter, and accordingly, a narrow zone of equidistance occurs between a location of a $w_1$ filter and a location of a $w_2$ filter with respect to the location of the luminescence event.

As further shown in FIG. 2, a first $w_1$ filter (e.g., filter 120-6) can have a plurality of $w_2$ filters adjacently located thereto. For example, each edge of filter 120-6, edges a, b, c, and d, are respectively bordered by $w_2$ filters 120-2, 120-5, 120-7, and 120-10.

It is to be appreciated that while filters 120-1-120-16 are illustrated as regular quadrilaterals (e.g., squares), the filter array 120 can be formed from filters having any desired sizes or shapes, where such shapes can be quadrilateral, icosahedral, triangular, pentagonal, hexagonal, n-sided shape, soccer-ball (e.g., a planar array of polygonal shapes used to form a truncated icosahedron in 2D form), circular, etc., or combinations thereof. Further, while the filter array 120 is presented as an array comprising 4×4 filters, the filter array 120 can comprise any number of filters, e.g., p×q filters where p and q are positive integers, whereby in an embodiment numbers p=q, and in another embodiment, p≠q.

The filters 120-1-120-16 can be formed from any suitable material(s) and/or composition. In an embodiment, filters 120-1-120-16 can be formed from a dielectric material(s). Further, the filters 120-1-120-16 can function in any desired manner. For example, the filters 120-1-120-16 can be any of a dichroic filter, an absorptive filter, a monochromatic filter, an infrared filter, an ultraviolet filter, a neutral density filter, a longpass filter, a bandpass filter, a shortpass filter, a guided-mode resonance filter, a polarizing filter, an optical filter, a notch filter, etc., or combination thereof. Hence, filters utilized to filter out the photons having wavelengths in $w_1$ can be formed from a material different to a material utilized to form the filters utilized to filter out the photons having wavelengths in $w_2$. When the filters 120-1-120-16 are dichroic filters, photons are either passed through the filters or are reflected back into the scintillator 110, which can preserve them for subsequent detection, potentially improving the signal-to-noise ratio of the apparatus.

In an embodiment, the apparatus 100 can include a plurality of detectors (collectively referred to as detectors 130), where each filter (e.g., each filter 120-1-120-16) in the filter array 120 can have a respective detector in the detectors 130 coupled thereto. In an aspect, a detector can be any device suitable to detect photons, such as a photomultiplier tube (PMT). As illustrated in FIG. 1, each detector in the detectors 130 is configured to detect photons emitted in the scintillator 110, and where, as previously described, each filter respectively allows photons in wavelengths $w_1$ or $w_2$ to pass through to a coupled detector. Accordingly, due to the filters, first detectors in the detectors 130 (e.g., shaded) can be configured to generate respective signals that are indicative of numbers of the emitted photons having wavelengths in $w_1$ that impact the first detectors over some range of time, while second detectors in the detectors 130 (non-shaded) can be configured to generate respective signals that are indicative of numbers of the emitted photons having wavelengths in $w_2$ that impact the second detectors over the range of time.

It is to be appreciated that at least some of the detectors in the detectors 130 can be replaced by a single position-sensitive detector, such as a position-sensitive photomultiplier tube (PSMPT), avalanche photodiode (APD) array, hybrid silicon-microchannel plate (MCP) system, or other photon counting imaging approach.

The apparatus 100 further includes a monitoring system 140, which is operably coupled to the detectors 130. The monitoring system 140 can include various processing devices, memory storage components, etc., as required to enable discrimination between neutrons and gamma rays (and other particles) that interact with scintillating material in the scintillator 110. In an example, the monitoring system 140 can be configured to compute a value that is indicative of the ratio of: (emitted photons having wavelengths in $w_1$)/(emitted photons having wavelengths in $w_2$) based upon signals generated by the detectors 130. For example, the monitoring system 140 can include various counters, threshold values, timing logic, etc., to enable identification of interactions (events) occurring in the scintillator 110, and accordingly, to enable determination of whether an interaction corresponds to a neutron, a gamma ray, or some other particle.

It is to be appreciated that FIG. 1 presents an "exploded view" of the scintillation apparatus 100. Accordingly, in construction and/or operation, the filter array 120 (and respective filters 120-1-120-16) can be located on an external surface (e.g., a back surface) of the scintillator 110. Further, the detectors 130 can, in an embodiment, be attached directly to each respective filter (e.g., respective filters 120-1-120-16). For instance, filters can be "grown" on respective faceplates of the detectors 130. In another embodiment, the detectors 130 can be connected to respective filters in the filter array 120 by a light-collecting optic(s), such as an optical fiber(s).

It is to be further appreciated that for the sake of illustration, the detectors 130 are illustrated as being a subset of detectors that may be respectively coupled to filters in the filter array 120; however the filters 120-6-120-8, 120-10-120-12, and 120-14-120-16 can each have a detector respectively coupled thereto to facilitate detection of photons.

Further, as previously mentioned, scintillator 110 can be a three-dimensional shape. Accordingly, in an exemplary embodiment, the scintillator 110 can be a rectangular cuboid, whereby the cuboid has six external faces, A-F. In an embodiment, five of the external faces (e.g., faces A-E) can have filter arrays (e.g., respective filter arrays 120) located on each respective surface. The sixth external face (e.g., face F) can be exposed to a radiation source of interest.

In an aspect, while FIG. 2 depicts the number of $w_1$ filters (e.g., depicted as the dark region filters) to be equal to the number of $w_2$ filters (e.g., depicted as the light region filters), other embodiments are also applicable. For example, to enable minimization of noise, a tiled arrangement of $w_1$ filters and $w_2$ filters can be configured such that there are a greater number of $w_1$ filters (e.g., a greater area) than $w_2$ filters in a situation where photons having wavelengths in $w_1$ are associated with a weaker overall signal (e.g., fewer photons having wavelengths in $w_1$ are emitted). Hence, when designing an arrangement of number, shape, and size of respective filters in a filter array, such factors as a dependence of an electronic noise level as a function of individual-detector size and number of detectors (e.g., detectors 130) being ganged together can be considered.

Further, while the various embodiments presented herein illustrate a filter array 120 comprising a first set of filters (e.g., filters 120-1, 120-3, 120-6, 120-8, 120-9, etc., as marked by the dark regions on FIGS. 1 and 2) and a second set of filters (e.g., filters 120-2, 120-4, 120-5, 120-7, etc., as marked by the light regions on FIGS. 1 and 2), other filter combinations are applicable. For example, a filter array can comprise more than two filter types, thereby enabling unique detection of photons in numerous (more than two) wavelength bands.

Furthermore, while FIGS. 1 and 2 illustrate the filter array 120 as comprising filters having an equal size (e.g., surface area), other array structures can be utilized, for example, filters can be of different sizes such that smaller-sized filters are utilized in a particular region of a filter array, while another region can be formed with larger-sized filters. For example, a smaller filter size can be utilized for filters located at the edge of a filter array, while larger filters can be utilized at the center of the array. With reference to FIG. 2, the outer filters (e.g., filters 120-1, 120-2, 120-3, 120-4, 120-5, 120-8, etc.) can be formed from filters having a smaller size than larger filters utilized to form the inner filters (e.g., filters 120-6, 120-7, 120-10, and/or 120-11). Accordingly, a larger number of smaller filters can be located around the edge of the filter array than the number of larger filters located at the center of the filter array. Further, as previously mentioned, a filter array can be formed with a soccer-ball patterning, which, for example, can be formed from a respective amount of pentagons and hexagons (or other desired polygons).

Further, with regard to the number of respective filters (e.g., p and q), a shape(s) of the filters, and/or size of the filters, a suitable scaling factor can be a range of travel (e.g., a track length, a traversal length, or an attenuation distance) of a scintillation-inducing particle (e.g., neutron, gamma ray, or other particle) through the scintillator 110. Moreover, whether the scintillating material attenuates a light signal and the extent of the attenuation can be taken into consideration when selecting parameters pertaining to the filters.

Figure 3:
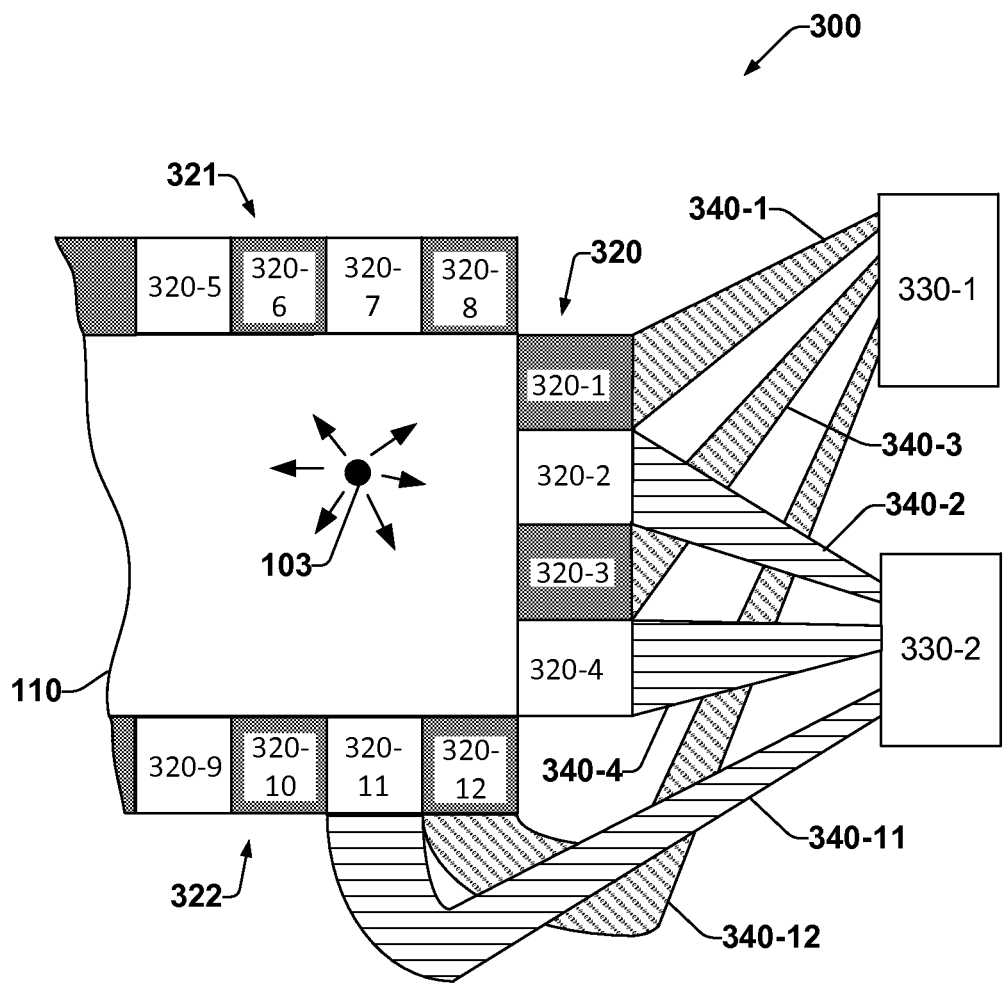
FIG. 3 illustrates an exemplary apparatus that is configured to discriminate between neutrons and gamma rays.

FIG. 3 illustrates a scintillator apparatus 300 comprising a first detector 330-1 and a second detector 330-2 being utilized to detect photons having wavelengths in $w_1$ and $w_2$, respectively. In an aspect, FIG. 3 is a sectional view through scintillator 110 in direction V, per FIG. 1. As illustrated in FIG. 3, the neutron 103 enters the scintillator 110 and interacts with the scintillating material, resulting in a luminescent event (emission of photons, shown by arrows). As described previously, the emitted photons can include photons having wavelengths in $w_1$ and photons having wavelengths in $w_2$. Further, as noted above, particular particle types (e.g., neutrons versus gamma rays) can be identified based upon a ratio between a number of photons having wavelengths in $w_1$ and a number of photons having wavelengths in $w_2$.

In the embodiment presented in FIG. 3, a plurality of filter arrays 320, 321, and 322 are located on the external surfaces of the scintillator 110. The filter array 320 is located on an end face of the scintillator 110, and comprises filters 320-1-320-4. The filter array 321 is located on a top face of the scintillator 110, and comprises filters 320-5-320-8. The filter array 322 is located on a bottom face of the scintillator 110, and comprises filters 320-9-320-12. It is to be appreciated that while the filter arrays 320, 321, and 322 are shown as respectively comprising four filters, the filter arrays can include a plurality of filters and can have a planar form, e.g., similar to filter array 120 (per FIGS. 1 and 2).

Accordingly, filters configured to allow photons having wavelengths in $w_1$ to pass therethrough (e.g., filters 320-1, 320-3, . . . 320-12, as marked with shading) are optically coupled to a first detector 330-1. The filters 320-1, 320-3, . . . 320-12, can be optically coupled to the detector 330-1 via respective light-collecting optics (e.g., optical fibers) 340-1, 340-3, and 340-12, whereby the light collecting optics are bundled at the first detector 330-1.

Further, filters configured to allow photons having wavelengths in $w_2$ to pass therethrough (e.g., filters 320-2, 320-4, 320-11, etc., as marked with no shading) are optically coupled to a second detector 330-2. The filters 320-2, 320-4, 320-11, can be optically coupled to the detector 330-2 via respective light-collecting optics 340-2, 340-4, and 340-11, whereby the light collecting optics are bundled at the detector 330-2.

While not shown, the detectors 330-1 and 330-2 can be connected to a monitoring system, e.g., such as monitoring system 140.

The light-collecting optics 340-1-340-12 can have any suitable configuration, whereby such configuration can be a fiber-optic taper, a fiber-optic bundle, etc. The light-collecting optics 340-1-340-12 can be fabricated from any suitable material, where such material can be glass, acrylic glass, poly(methyl methacrylate) (PMMA), etc.

It is to be appreciated that for the sake of illustration and understanding, only six of the filters are illustrated as being connected to the respective detector; however, each of the filters 320-1-320-12 can be connected, via respective light-collecting optics, to the respective detector 330-1 or 330-2.

Compared with the scintillator apparatus 100 presented in FIG. 1, where each filter is coupled to a particular detector (e.g., filter 120-1 is coupled to detector 130-1, filter 120-2 is coupled to detector 130-2, etc.), only a pair of detectors 330-1 and 330-2 are utilized in the scintillator apparatus 300. The scintillator apparatus 300 arrangement can be advantageous for the following considerations:

a) in a situation where the detectors 130 are respectively too large to enable a "fine-grained" tiling arrangement of filters 120-1-120-16 to be formed.

b) each of the detectors 130 generates a magnitude of electronic noise, such that when the electronic noise from all of the detectors 130 is combined (e.g., when detectors 130 are "ganged" together), the combined electronic noise is greater than an acceptable amount.

c) utilizing the detectors 130 may require a volume of multichannel instrumentation that introduces an unacceptable degree of complexity, bulk, or expense.

d) exotic, high-efficiency photocathode materials are not available in standard detector arrays.

e) a reliability of any of detectors 130 may be low, and replacement in-situ is impractical.

f) the scintillator 110 is to operate in a hard environment, and accordingly, the detectors 130 cannot be exposed to radiation, and hence are to be located remotely from the scintillator 110.

In an aspect, utilizing two detectors 330-1 and 330-2 enables the scintillation apparatus 300 to operate with less noise than the scintillation apparatus 100 that utilizes the plurality of detectors 130.

It is to be appreciated that while the respective filters 320-1-320-12 are illustrated in FIG. 3 as being located between the scintillator 110 and the light-collecting optics 340-1-340-12, the filters 320-1-320-12 can be respectively located at a detector end of each light-collecting optics 340-1-340-12. For example, a first end of each of the light-collecting optics 340-1-340-12 can be located adjacent to the scintillator 110, and a second end (e.g., the detector end) of each of the light-collecting optics 320-1-320-12 can be located at the respective detector 330-1 or 330-2, with the respective filters 320-1-320-12 being located between the detector end of a light-collecting optic (e.g., any of light-collecting optics 340-1-340-12) and the respective detector (e.g., any of detectors 330-1 or 330-2). In an embodiment, spectral filtering material can be incorporated into the light-collecting optics 340-1-340-12. Any suitable material can be utilized to enable spectral filtering, for example, such material can be a dye-doped polymer.

Figure 4:
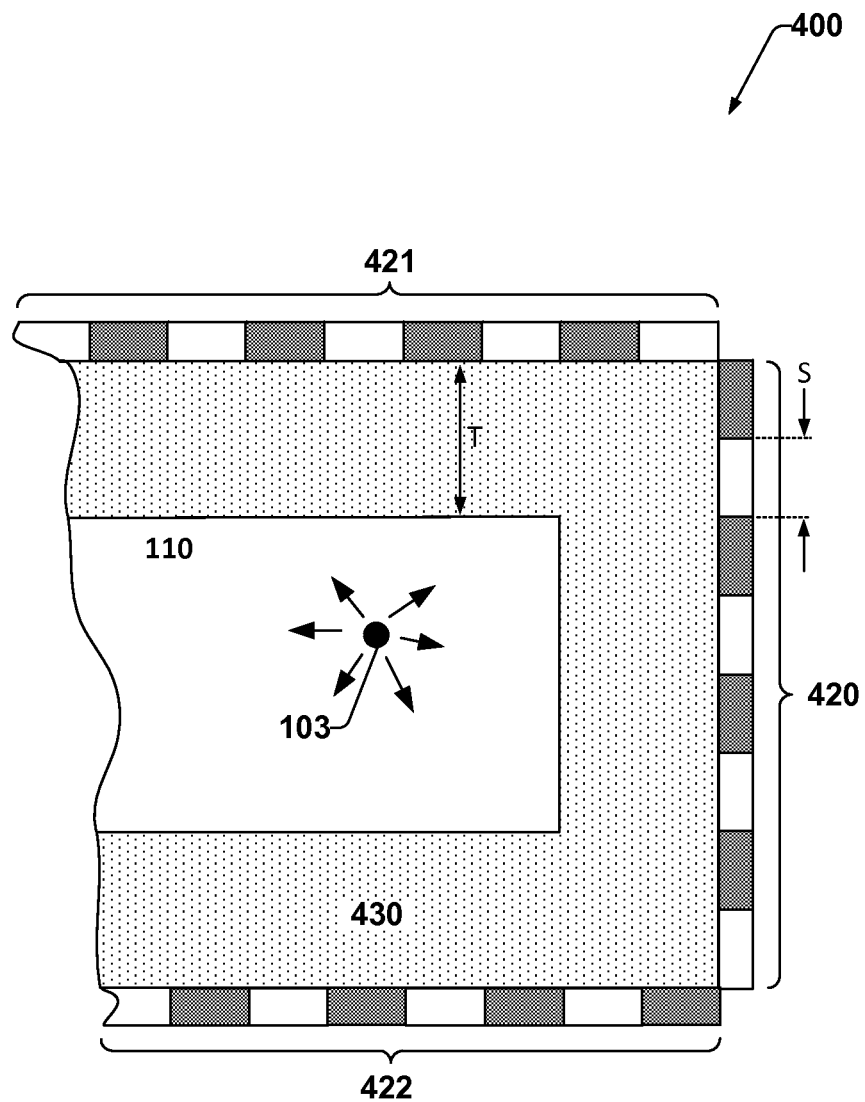
FIG. 4 illustrates an exemplary apparatus that includes a scintillator, a buffer layer, and filter arrays, where the buffer layer is positioned between the scintillator and the filter arrays.

In an aspect, a phenomenon of radiation "skimming" may occur, whereby, for example, the neutron enters the scintillator (e.g., scintillator 110) and travels through the scintillator with a path close to, or along, an external surface of the scintillator, whereby the neutron "skims" along the external surface of the scintillator. Accordingly, light emission corresponding to a neutron, for example, may be limited to a small region close to a particular filter (e.g., the filter 120-7), but whereby the small region is further away from all the other filters (e.g., the filters 120-1-120-6 and 120-8-120-16). Hence, it can be a challenge to achieve a fine granularity of filters 120-1-120-16 in filter array 120 such that even a shortest of particle track lengths extends over multiple filters. To enhance a degree of detection homogenization, e.g., to prevent a single filter (e.g., any one of the filters 120-1-120-16) from subtending a large solid angle at an emitting location (e.g., the single point source), a standoff distance between the scintillator and the filter array(s) can be increased, e.g., by introducing a gap between the scintillator and the filter array, as illustrated by a scintillator system 400, presented in FIG. 4.

Scintillator system 400 comprises a scintillator 110 and a plurality of filter arrays 420-422, whereby scintillator 110 is separated from the plurality of filter arrays 420-422 by a buffer layer 430. The buffer layer 430 can be formed from any suitable material, whereby, in an aspect the buffer layer 430 is transparent.

In an aspect, the buffer layer 430 can have a thickness T (e.g., a standoff distance). Accordingly, to reduce a solid angle of any particular filter in the filter arrays 420-422, a size S of each filter (e.g., wherein each filter is a square tile, a length of a side of the square is S) can have a magnitude such that the ratio S/T is less than unity (e.g., S/T<1). To maximize detection homogenization, the thickness T of the buffer layer 430 should be at least a few times the size S.

In an embodiment, material of the buffer layer 430 can be selected to be index-matched to the scintillating material of the scintillator 110 such that photons emitted in the scintillator 110 can proceed through the buffer layer 430 undeviated to the filter arrays 420-422. Some emitted photons can have a high angle of incidence upon a respective filter in any of the filter arrays 420-422. In an aspect where a filter is formed from a dielectric material, such a high angle of incidence can cause a transmission band of the filter to appear shifted in wavelength. Further, a mismatch (e.g., a deliberate mismatch) of the material of the buffer layer 430 can facilitate prevention of an escape of high-angle light rays from the scintillator 110, such that high Fresnel losses and/or total internal reflection (TIR) can occur. In an embodiment, to facilitate such mismatch, the buffer layer 430 can be an air layer. Accordingly, a scintillator 110 can be designed to have a geometry that can enable redirection of internally-reflected photons towards a facet of the scintillator 110 that enables exiting of the photons at an angle closer to normal incidence.

While not shown, it is to be appreciated that the various filters in the filter arrays 420-422 can be connected to a respective detector (e.g., any of detectors referenced above) and a monitoring system (e.g., monitoring system 140), to enable detection and/or monitoring of photons at the respective filter.

Figure 5:
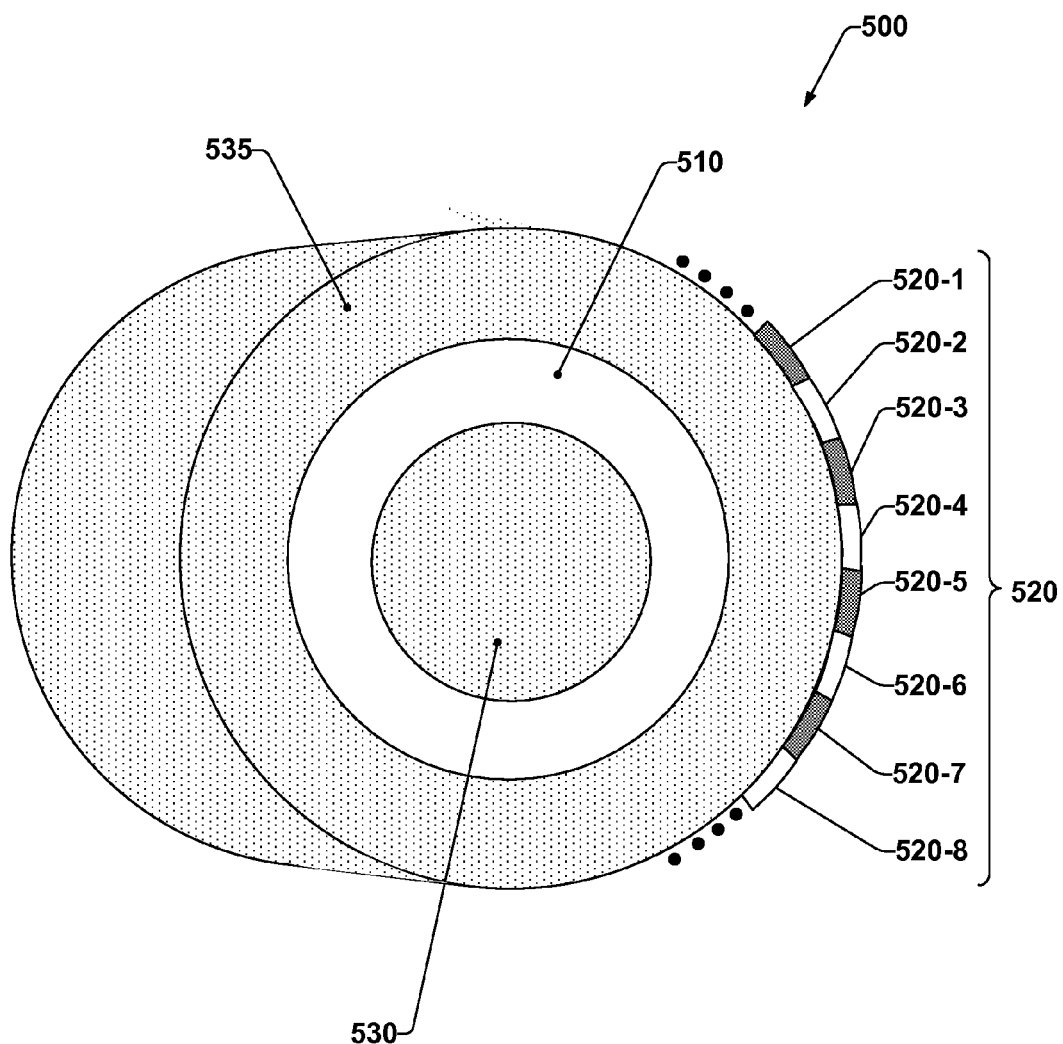
FIG. 5 illustrates an exemplary apparatus that includes a scintillator, buffer layer(s) and a filter array attached thereto.

In an aspect, self-absorption of scintillation energy can occur in a scintillator, particularly where a scintillator has been designed to have a volume of sufficient magnitude to increase or maximize a likelihood of scintillation events occurring. FIG. 5 illustrates an apparatus 500 having a geometry which can be utilized to reduce self-absorption effects, whereby such a geometry reduces a path length a photon traverses through a scintillator while maintaining sufficient volume of scintillator material to allow for events to occur.

The scintillator apparatus 500 comprises a central cylinder of buffer material 530, around which is located a shell volume of scintillator 510 (e.g., in the form of a tube or hollow cylinder). An optional external volume of buffer material 535 can be formed around the outside of the scintillator 510 to maximize detection homogenization, as previously described with reference to FIG. 4. In an embodiment, a filter array 520, comprising a tiled arrangement of filters 520-1-520-8, can be located on the exterior surface of scintillator 510, e.g., when the external buffer material 535 is not present. In another embodiment, the filter array 520 can be located on the exterior surface of the external buffer material 525 where the detection homogenization arrangement is utilized. As previously mentioned, material of the buffer cylinder 530 and the exterior buffer material 535 can be of any suitable composition that is transparent. Further, while not shown, a filter array can also be located on a base end of the scintillator 510.

It is to be appreciated that while the shape of the scintillator 510 is illustrated as being a tube or hollow cylinder, other three-dimensional volumes can be utilized, for example, scintillator 510 can be a cylinder having a box-like or hollow square profile, and buffer materials 530 and 535 can have geometries according to the selected shape of scintillator 510.

Figure 6:
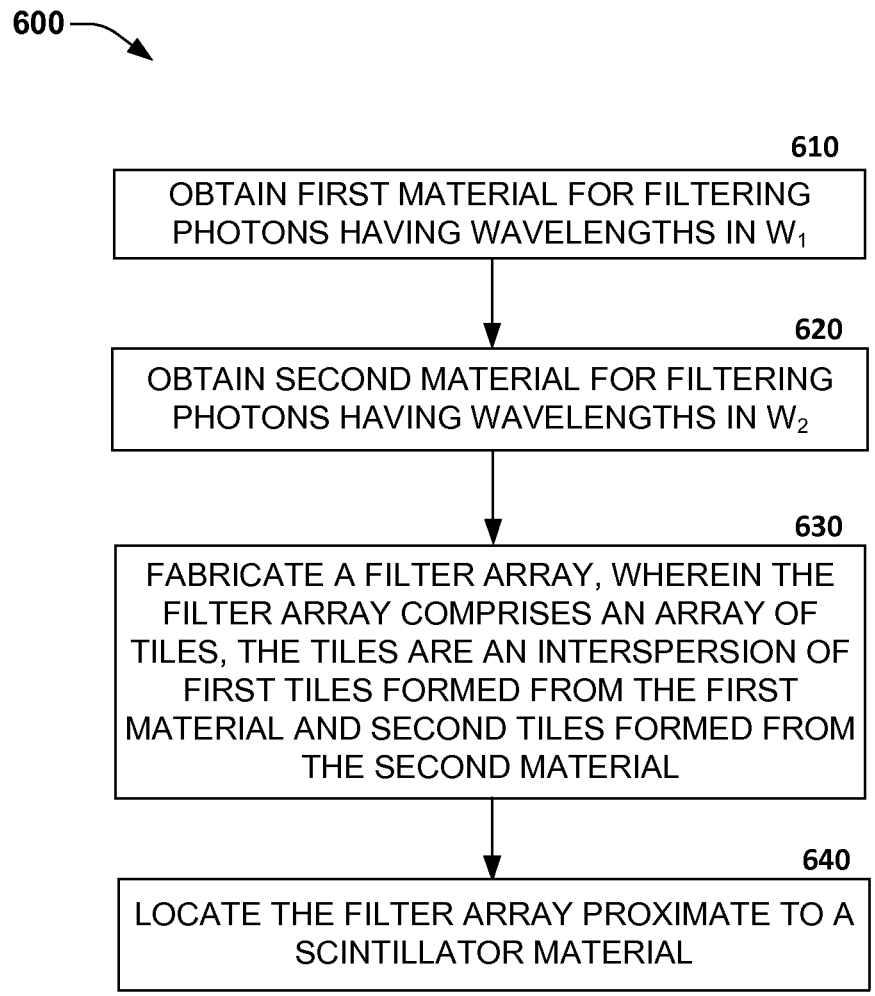
FIG. 6 is a flow diagram illustrating an exemplary methodology for fabricating a filter array.
Figure 7:
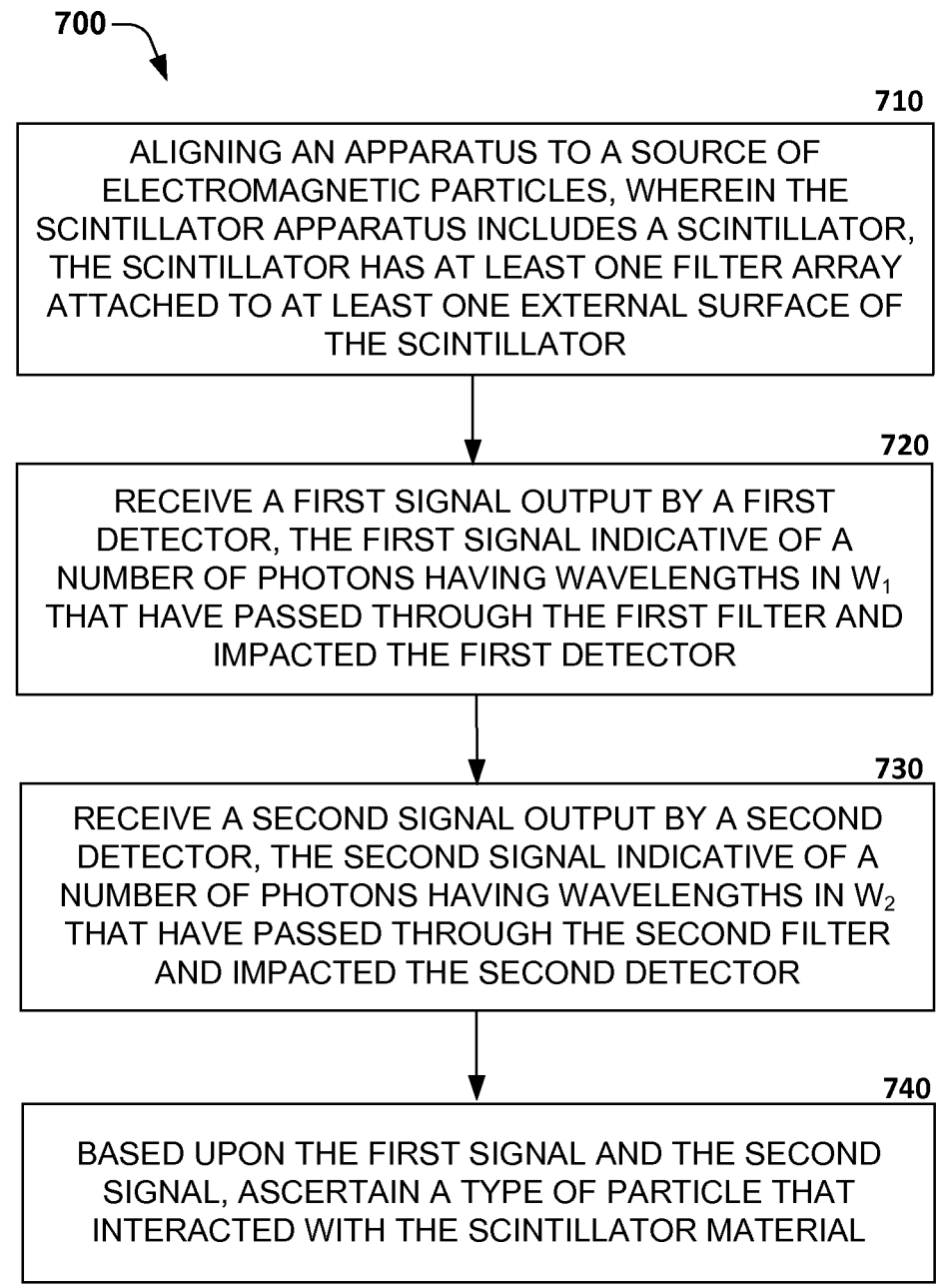
FIG. 7 is a flow diagram illustrating an exemplary methodology for ascertaining a type of an electromagnetic particle.

FIGS. 6 and 7 illustrate exemplary methodologies relating to identifying particles (e.g., discriminating between neutrons, gamma rays, and the like). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 6 illustrates an exemplary methodology 600 for fabricating an apparatus that is configured to identify a particle. At 610, first material for filtering photons having wavelengths in $w_1$ is obtained. A first plurality of "tiles" (or "pixels") are formed from the first material.

At 620, second material for filtering photons having wavelengths in $w_2$ is obtained, wherein $w_1$ is disparate to $w_2$. A second plurality of tiles are formed from the second material.

In an aspect, the first material and the second material can be dichroic filters, such that, during operation of the spatial scintillator apparatus, any photons which do not pass through the respective filter are reflected back from the respective filter into the scintillator. Accordingly, by reflecting the photons back into the scintillator, the photons are still available to be detected through a filter configured to the wavelength(s) of the photons.

At 630, a filter array is fabricated, whereby the filter array comprises an interspersion of the first plurality of tiles formed from the first material and the second plurality of tiles formed from the second material. The respective first plurality of tiles and the second plurality of tiles can be interspersed such that a tile formed from the first material has located adjacent thereto at least one tile formed from the second plurality of tiles.

At 640, the filter array can be located proximate to a volume of scintillator material. The scintillator material can be of any suitable 3D volume. In an embodiment, the scintillator can be a cuboid, whereby five external faces of the cuboid can have a filter array located thereon, while the sixth external face can be left exposed to facilitate directing the scintillator to a source of particles (e.g., a nuclear reaction) that is to be monitored. In another embodiment, the scintillator material can have a cylindrical or tubular volume, whereby an external surface of the volume can have the filter array located thereon.

FIG. 7 illustrates an exemplary methodology 700 for identifying an electromagnetic particle. At 710, an apparatus can be aligned to a source of electromagnetic particles (e.g., neutrons, gamma rays, etc.). The apparatus can include a volume of scintillator material, wherein the volume of scintillator material can be of any suitable shape. In an embodiment, the scintillator material can be a cuboid, whereby five external faces of the scintillator cuboid can have a filter array located thereon, while the sixth external face can be left exposed to facilitate aligning the scintillator to the source of the electromagnetic particles. In another embodiment, the scintillator material can have a cylindrical or tubular volume, whereby an external surface of the volume can have the filter array located thereon, and a first end of the scintillator cylinder (or tube) can be aligned towards the source of the electromagnetic particles. Further, a second end (e.g., opposite to the first end) can have a filter array located thereon also.

The apparatus can further comprise a plurality of detectors (e.g., PMT's). Depending upon how the apparatus is configured, a first detector (or plurality of first detectors) can be connected to a first plurality of tiles in the filter array, where, as previously described, the first plurality of tiles can be formed from a first material that allows photons having wavelengths in $w_1$ to pass therethrough while photons having wavelengths outside of $w_1$ do not pass through the first filter tile(s). Further, a second detector (or plurality of second detectors) can be connected to a second plurality of filter tiles in the filter array, where, as previously described, the second plurality of filter tiles can be formed from a second material that allows photons having wavelengths in $w_2$ to pass through the second filter tile(s) while photons having wavelengths outside of $w_2$ do not pass through the second filter tile(s).

At 720, a first signal output by the first detector is received, wherein the first signal is indicative of a number of photons having wavelengths in $w_1$ that have passed through the first filter and impacted the first detector (over some time range).

At 730, a second signal output by the second detector is received, wherein the second signal is indicative of a number of photons having wavelengths in $w_2$ that have passed through the second filter and impacted the second detector (over the time range).

At 740, based at least in part upon the first signal and the second signal, a type of particle that interacted with the scintillator material can be ascertained. For example, a ratio between a magnitude of the first signal and a magnitude of the second signal can be indicative of the type of particle. In addition, other information can be contemplated when ascertaining the type of material, such as time of detection of photons, inferred position of the interaction in the scintillator, etc.

It is to be further appreciated that while the various embodiments described herein relate to particle detection in accordance with a luminescence event (e.g., photoluminescence, radioluminescence, etc.) the application of spatial sampling to reduce error and bias (as can be achieved with the various embodiments herein) can equally apply to photometry technologies as well, to improve photometric accuracy during sampling.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An apparatus comprising:
   a scintillator;
   a filter array, the filter array comprising:
      a first plurality of filters configured to filter photons having wavelengths outside of a first wavelength band;
      a second plurality of filters configured to filter photons having wavelengths outside of a second wavelength band, wherein the first plurality of filters and the second plurality of filters are co-located as tiles forming the filter array;
   a plurality of detectors, wherein:
      filters in the first plurality of filters are attached to a first detector in the plurality of detectors; and
      filters in the second plurality of filters are attached to a second detector in the plurality of detectors; and
   a buffer layer, wherein the buffer layer is located between the scintillator and the filter array.

2. The apparatus of claim 1, wherein the first plurality of filters and the second plurality of filters have a quadrilateral shape.

3. The apparatus of claim 1, wherein a filter in the first plurality of filters is located adjacent to a filter in the second plurality of filters.

4. The apparatus of claim 1, wherein the first plurality of filters and the second plurality of filters are dichroic filters.

5. The apparatus of claim 1, wherein the filter array is attached to an external surface of the scintillator.

6. The apparatus of claim 5, wherein the scintillator is cylindrical.

7. The apparatus of claim 5, wherein the scintillator is cubic having six external faces.

8. The apparatus of claim 7, further comprising four filter additional arrays respectively located on four other external faces of the scintillator.

9. The apparatus of claim 1, further comprising a plurality of light-collecting optics, wherein the light-collecting optics are configured to connect the filters in the first plurality of filters to the first detector and connect the filters in the second plurality of filters to the second detector.

10. The apparatus of claim 1, the filter array further comprising:
   a third plurality of filters configured to filter photons having wavelengths outside of a third wavelength band.

11. A method for identifying an electromagnetic particle, comprising:
   receiving a first signal that is indicative of a number of photons that have wavelengths in a first wavelength band that have passed through a first filter of a tiled filter array and impacted a first detector, the first filter configured to filter photons having wavelengths outside of the first wavelength band;
   receiving a second signal that is indicative of a number of photons that have wavelengths in a second wavelength band that have passed through a second filter of the tiled filter array and impacted a second detector, the second filter configured to filter photons having wavelengths outside of the second wavelength band; and
   identifying the electromagnetic particle based upon the first signal and the second signal, the photons in both wavelengths being emitted from a scintillator responsive to the electromagnetic particle interacting with scintillator material of the scintillator.

12. The method of claim 11, wherein the first filter and the second filter are included in a filter array that comprises a plurality of filters, the method further comprising laying out the plurality of filters to form a tiled array.

13. The method of claim 12, wherein the first filter and the second filter are dichroic filters.

14. The method of claim 12, further comprising locating the filter array on an external surface of the scintillator.

15. A scintillator apparatus, comprising:
   a scintillator;
   a filter array located on an external surface of the scintillator, wherein the filter array comprises:
      a first filter configured to allow passage of photons in a first wavelength band to pass therethrough; and
      a second filter configured to allow passage of photons in a second wavelength band to pass therethrough, the first filter and the second filter have a tile profile and are positioned adjacent to one another to form the filter array, the first wavelength band and the second wavelength band being non-overlapping; and a buffer layer, wherein the buffer layer is located between the scintillator and the filter array.

16. The scintillator apparatus of claim 15, wherein the first filter and the second filter are dichroic filters.

17. The scintillator apparatus of claim 15, further comprising a first detector and a second detector, wherein the first detector is optically coupled to the first filter and the second detector is optically coupled to the second filter.

* * * * *